Feb. 8, 1944.　　A. H. ORCUTT　　2,340,978
MACHINE FOR GAUGING THE HELIX OF HELICAL TOOTHED GEAR WHEELS
Filed Aug. 25, 1942　　2 Sheets-Sheet 1

Inventor
A. H. Orcutt
By Hascock Downing v Liebold
Attys

Feb. 8, 1944.  A. H. ORCUTT  2,340,978
MACHINE FOR GAUGING THE HELIX OF HELICAL TOOTHED GEAR WHEELS
Filed Aug. 25, 1942   2 Sheets-Sheet 2

Inventor
A. H. Orcutt
By Hancock Downing & Seebold
Attys

Patented Feb. 8, 1944

2,340,978

UNITED STATES PATENT OFFICE 2,340,978

MACHINE FOR GAUGING THE HELIX OF HELICAL TOOTHED GEAR WHEELS

Arthur Hitchcock Orcutt, Shirley, near Birmingham, England, assignor to The Gear Grinding Company Limited, Shirley, near Birmingham, England Application August 25, 1942, Serial No. 456,077
In Great Britain October 7, 1941

1 Claim. (Cl. 33—179.5)

This invention has for its object to provide an improved machine for gauging (that is to say measuring or checking the accuracy of) the helix, or lead, of helical toothed gear wheels.

Figure 1:
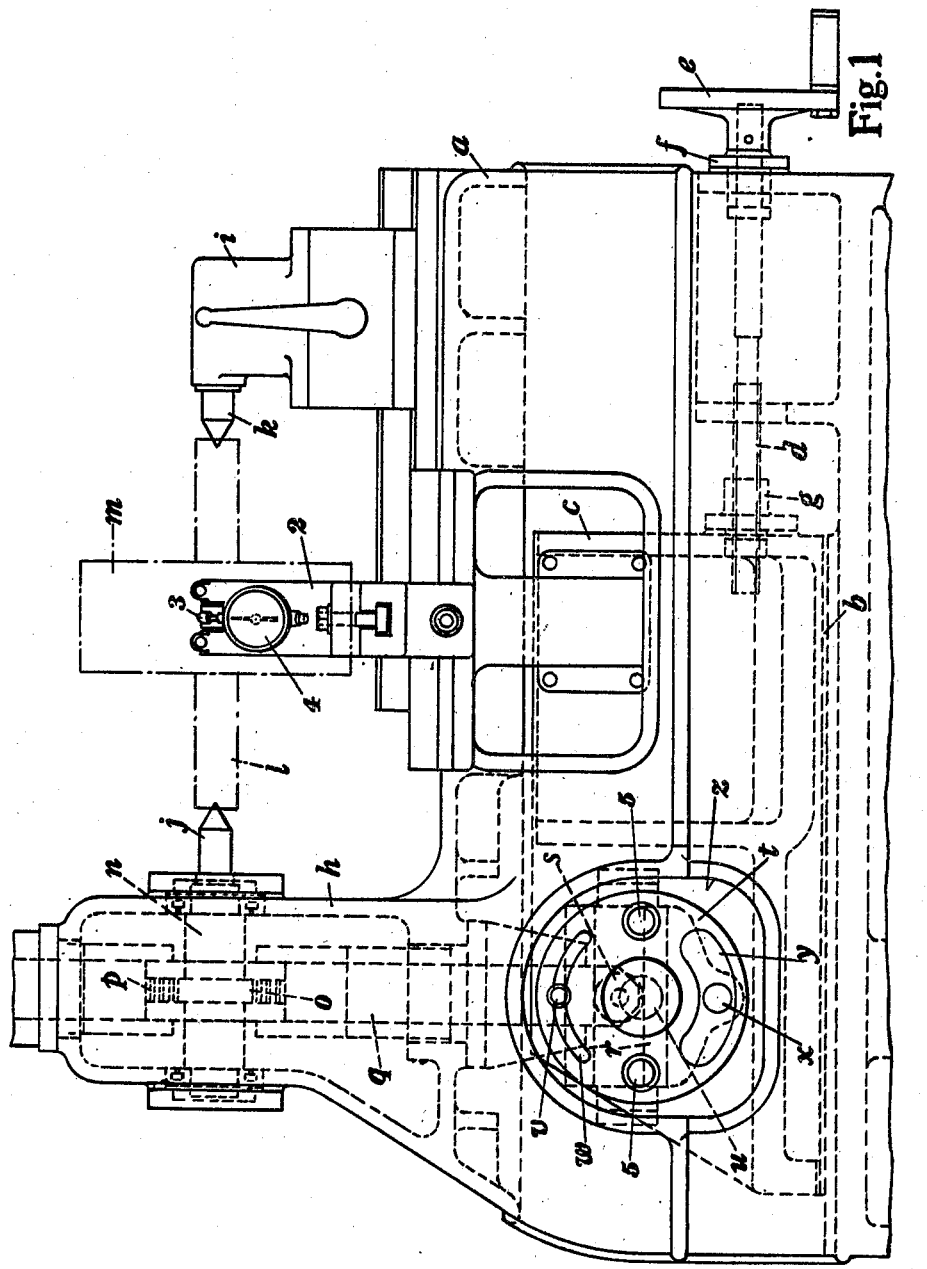
Figure 2:
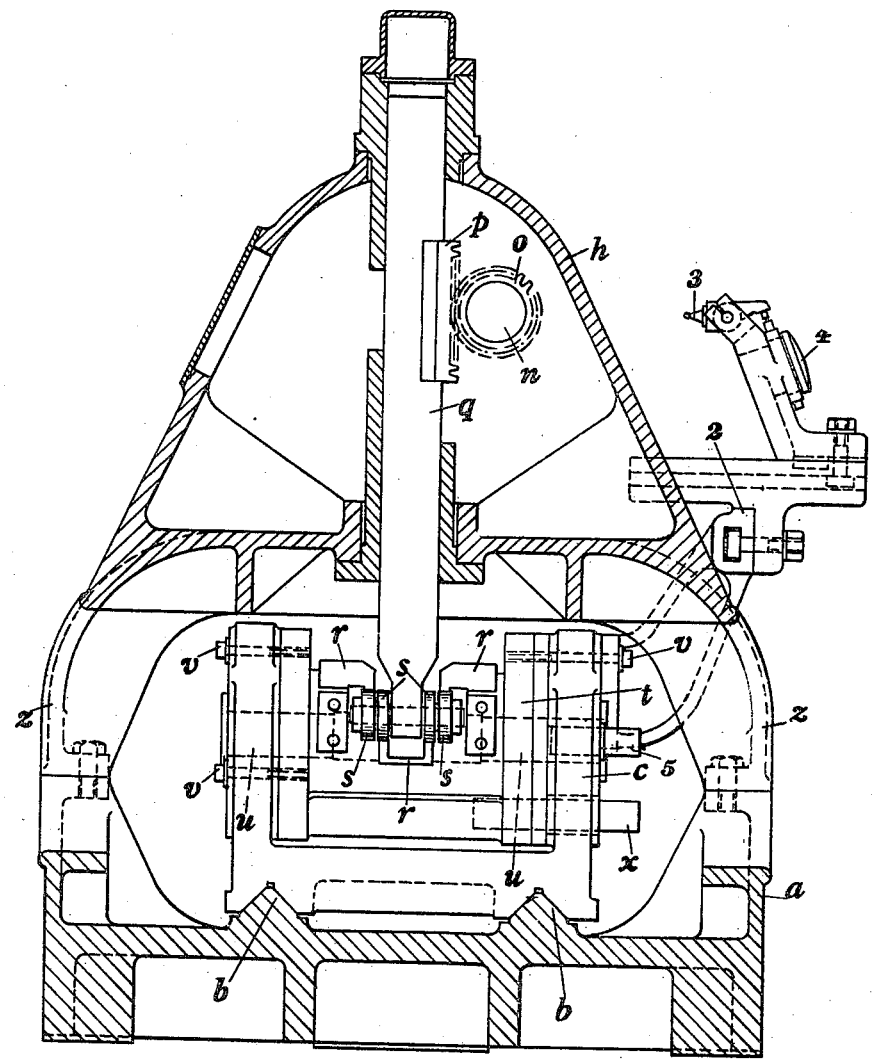

In the accompanying sheets of explanatory drawings, Figure 1 is a side elevation and Figure 2 a sectional end elevation of a machine constructed in accordance with the invention.

In carrying the invention into effect as shown, I employ a hollow body part $a$ in the bottom of which are provided a pair of horizontal guides $b$, and on these guides I mount a slidable carriage $c$ which can be moved along the guides by a rotatable but axially immovable screw $d$ having an operating hand wheel $e$ at one end. At a position near this end the screw $d$ passes through and is supported by any convenient bearing $f$ in the adjacent end of the body part $a$, the other end of the screw being in engagement with and passing through a non-rotatable nut $g$ on the adjacent end of the carriage $c$. On the upper side of the body part $a$ are arranged fixed and slidable headstocks $h$, $i$ having centres $j$, $k$ for supporting the adjacent ends of a mandrel $l$ carrying the gear wheel $m$ to be examined. In the fixed headstock $h$ is arranged a spindle $n$ having at its outer end the centre $j$ for engaging the adjacent end of the mandrel $l$ carrying the gear wheel, and on an intermediate portion of this spindle is mounted or secured a pinion $o$ which engages a short rack $p$ on a vertically slidable bar $q$, the lower end of the latter being arranged to extend through the lower end of the fixed headstock.

On the end of the carriage $c$ beneath the lower end of the bar $q$ are mounted a pair of upper and lower guides $r$ situated at opposite sides of the lower end of the bar and engaged by rollers $s$ carried on the said end of the bar. These guides $r$ are arranged between and secured to (or formed on) the sides of a cradle-like member $t$ pivotally supported by trunnions $u$ on the carriage $c$. This cradle-like member $t$ is rotatably adjustable about its pivot axis and can be secured in any desired position by screws $v$ passing through arcuate slots as $w$ in the sides of the carriage $c$ into engagement with adjacent ends of the cradle-like member, the heads of the screws being arranged to bear on the corresponding side faces of the carriage either directly or through the medium of washers. For enabling the cradle-like member $t$ to be set by the operator in the angular position required to suit the hand and angle of the helix of the teeth on the wheel to be examined a pin $x$ is secured to one end of the said member at a position spaced from its pivot axis, and extends through an arcuate slot $y$ in the adjacent side of the carriage $c$. Also a pair of fixed pins 5 are secured on this side of the carriage, the arrangement being such that the position of the pin $x$ relatively to one or the other of the fixed pins determines the setting of the cradle-like member $t$. Access to the pins $x$, 5 and the securing screws $v$ is afforded by openings $z$ in the sides of the body part $a$.

The carriage $c$ also carries a bracket 2 on which can be adjustably mounted a pivotal or like feeler 3. In the example shown this feeler 3 consists of a lever one end of which can be moved into contact with one side of one of the teeth of the wheel $m$ to be examined, the other end of the lever being adapted to actuate any convenient measuring or indicating means, such as a micrometer gauge 4 of the dial type which is also mounted on the same bracket as the feeler.

The purpose of the machine above described is to gauge the helix or lead of the teeth on the wheel to be examined. Before carrying out the examination the guides $r$ which engage the rollers $s$ on the vertically slidable bar $q$ are first accurately adjusted to the inclination corresponding to the helix of the wheel and are then secured. For convenience of illustration the guides are shown in the drawings in their horizontal or zero position, but it will be understood that in actual use they are adjusted to the appropriate inclination as above described. The wheel $m$ is also mounted between the two headstocks $h$, $i$ and secured by any convenient means to the spindle $n$ of the fixed headstock. Also one end of the feeler 3 is brought into contact with one side of a tooth on the wheel $m$ and the gauge 4 may be adjusted to its zero position. To carry out the examination the carriage $c$ is caused to move along its guides $b$. This causes the guides $r$ engaging the rollers $s$ at the lower end of the vertically slidable bar $q$ to impart longitudinal movement to the bar and so impart angular movement to the wheel $m$. At the same time the carriage $c$ causes the feeler 3 to slide along the wheel tooth. If the helix of the latter is exactly in conformity with the setting of the guides $r$ which operate the bar $q$, no movement will be imparted through the feeler to the gauge 4. But any disconformity will be revealed by deflection of the feeler 3, and the amount of the disconformity will be measured by the gauge 4. The helix or lead of each tooth may be examined in like manner after returning the carriage $c$ to its initial position and moving the wheel through an appropriate angle so that the feeler 3 may be brought into contact with another tooth.

By this invention I am able to provide means of a simple and robust form whereby the required examination can be effected accurately and reliably.

The invention is not limited to the example above described as subordinate constructional or mechanical details may be varied to suit different requirements.

Having thus described my invention what I claim as new and desire to secure by Letters Patent is:

A machine for gauging the helix of helical toothed gear wheels, comprising in combination a vertically slidable bar through which angular movement can be imparted to the toothed wheel to be examined, a horizontally slidable carriage, a cradle-like member supported by and pivotally adjustable on the carriage, guiding means provided on the cradle-like member and adapted by engagement with the bar to impart positive vertical sliding movement in both directions to the bar during horizontal movements of the carriage, a feeler supported by the carriage and adapted to bear on one side of a tooth of the said wheel, and means for indicating the deflection of the feeler.

ARTHUR HITCHCOCK ORCUTT.